United States Patent [19]

Castellano et al.

[11] Patent Number: 5,118,491
[45] Date of Patent: Jun. 2, 1992

[54] PROCESS FOR PREPARING MIXED OXIDES OF ZIRCONIUM AND YTTRIUM

[75] Inventors: Maurizio Castellano, Turin; Thomas P. Lockhart, San Donato Milanese, both of Italy

[73] Assignee: 501 Eniricerche S.p.A., Milan, Italy

[21] Appl. No.: 661,829

[22] Filed: Feb. 27, 1991

[30] Foreign Application Priority Data

Mar. 2, 1990 [IT] Italy .................. 19536 A/90

[51] Int. Cl.$^5$ .................................. C01G 25/02
[52] U.S. Cl. ........................ 423/608; 423/266; 423/593; 501/103
[58] Field of Search .............. 423/266, 593, 608; 501/103, 12

[56] References Cited

U.S. PATENT DOCUMENTS

| | | | |
|---|---|---|---|
| 4,501,818 | 2/1985 | Rossi | 423/608 |
| 4,627,966 | 12/1986 | Micheli | 423/608 |
| 4,664,894 | 5/1987 | Suzuki et al. | 423/608 |
| 4,719,091 | 1/1988 | Wusirika | 423/608 |

FOREIGN PATENT DOCUMENTS

| | | | |
|---|---|---|---|
| 56-145118 | 11/1981 | Japan | 501/103 |
| 62-132708 | 6/1987 | Japan | 501/103 |

*Primary Examiner*—William R. Dixon, Jr.
*Assistant Examiner*—Anthony J. Green
*Attorney, Agent, or Firm*—Hedman, Gibson & Costigan

[57] ABSTRACT

Mixed oxides of zirconium and yttrium [$ZrO_2(Y_2O_3)$], with an yttrium content (as computed as elemental metal) comprised within the range of from about 15 to about 21% by weight, as spherical particles with size comprised within the range of from 0.1 to 2 $\mu m$, with an average size of the particles lower than 1 $\mu m$, in the cubic crystal form, are obtained by:

preparing a mixture by starting from an aqueous solution of zirconium and yttrium carboxylates; an organic solvent selected from the group consisting of nitriles or alcohols; and a non-ionic surfactant;

causing solid colloidal particles of the precursor of mixed zirconium/yttrium oxides to precipitate from said mixture, by operating at a pH value comprised within the range of from 5 to 7, at room temperature or at temperature close to room temperature; and calcining said precipitate of solid particles at a high temperature to cause said solid particles to be directly converted from the amorphous state into the cubic crystal form.

According to a particular form of practical embodiment, ultrasounds are applied to the mixture during said precipitation step, to further reduce the size of the precipitated particles.

The so obtained mixed oxides of zirconium and yttrium are suitable for use in the electronic sector, in particular as a solid electrolyte for fuel flow cells.

14 Claims, No Drawings

PROCESS FOR PREPARING MIXED OXIDES OF ZIRCONIUM AND YTTRIUM

The present invention relates to a process for preparing the mixed oxides of zirconium and yttrium, suitable for use in the electronic sector, in particular as a solid electrolyte for fuel-flow cells.

Several mixed metal oxides are used in the electronic and mechanical sectors. An example thereof is zirconium dioxide ($ZrO_2$), which is stabilized in either of two crystal forms, as a function of the amount of yttrium oxide ($Y_2O_3$) incorporated inside it. In particular, it is well-known that in the mixed oxide, at a level of approximately 4 mol % of yttrium oxide, the tetragonal phase of zirconium dioxide is stabilized—which shows an extremely good mechanical stability; whereas at levels higher than 8 mol %, the cubic form, displaying interesting characteristics for application as the electrolyte in fuel-flow cells, is stabilized.

For the latter application, metal oxides in the form of spherical particles with a size as uniform as possible and of the order of one micron or less, are required.

According to the technique known from the prior art, metal oxides constituted by particles with submicronic size can be obtained by precipitation from homogeneous solutions of the inorganic salts of metals, as described, e.g., by E. Matijevic, Acc. Chem. Res. (1981) 14, 22; in U.S. Pat. No. 4,649,037 and in Japanese patent application No. 59-069,471. Another route known from the prior art is based on sol/gel reactions from organometallic precursors, such as described, e.g., by P. Colomban, in L'Industrie Ceramique (1985), N. 792, 186.

Still another route is based on reactions of precipitants from emulsions, as described by A. B. Hardy in "Preparation of Submicrometer Unagglomerated Oxide Particles by Reaction of Emulsion Droplets", Ph. D. Thesis, Massachusetts Institute of Technology, Cambridge, Mass. (1988); M. Akins in "Preparation of Fine Oxide Powders by Emulsion Precipitation", Ph. D. Thesis, Iowa State University, des Moines, Iowa (1987); and G. Gowda et al. in "Ceramic Powder from Sol-Emulsion-Gel Techniques", Final Project Report (R10), Am. Cer. Soc. Basic Science: Electronics and Glass Divisions Joint Meeting, New Orleans (La.), November 1986.

However, these approaches known from the prior art have not proved satisfactory owing to at least one of the following aspects: incapability of producing mixed oxides as particles having spherical shape and constant morphology, incapability or difficulty in reproducing the preparation method, and use of expensive reactants, such as, e.g., metal alkoxides.

The present Applicant has now found a simple and economically advantageous process which enables mixed oxides of zirconium and yttrium to be obtained in the cubic crystal form, as spherical particles with average size smaller than 1 μm, and with excellent reproducible morphological characteristics.

In accordance therewith, the present invention relates to a process for preparing particles of mixed oxides of zirconium and yttrium [$ZrO_2(Y_2O_3)$], having an yttrium content (computed as elemental metal) comprised within the range of from about 15 to about 21% by weight, as spherical particles, having a size comprised within the range of from 0.1 to 2 μm, with an average size of the particles lower than 1 μm, in the cubic crystal form, characterized in that:

- a mixture is prepared by starting from an aqueous solution of zirconium and yttrium carboxylates; an organic solvent selected from the group consisting of the aliphatic nitriles containing from 1 to 3 carbon atoms in their alkyl moiety, and of the aliphatic alcohols containing from 8 to 11 carbon atoms in their molecule; and a non-ionic surfactant;
- the precipitation is caused to take place from said mixture, of solid colloidal particles of the precursors of mixed zirconium/yttrium oxides by operating at a pH value comprised within the range of from 5 to 7, at room temperature or at temperatures close to room temperature; and
- said precipitate of solid particles is calcined at a high temperature to cause said solid particles to be directly converted from the amorphous state into the cubic crystal form.

Yttrium and zirconium carboxylates suitable for the intended purpose preferably are the salts of lower aliphatic carboxy acids, in particular zirconium and yttrium acetates.

The organic solvents are preferably selected from among acetonitrile and n-octanol.

The non-ionic surfactants are preferably selected from among the ethoxylated aliphatic alcohols having from 8 to 12 carbon atoms in their alkyl moiety and from 4 to 8 condensed units of ethylene oxide in their ethoxy portion.

When an aliphatic alcohol of from 8 to 11 carbon atoms is used as the organic solvent, a water-in-oil (W/O) emulsion is formed. When an aliphatic nitrile containing from 1 to 3 carbon atoms in its alkyl moiety is used for the same purpose, a single-phase mixture is obtained.

It should be observed that the combined use of the nitrile or alcohol solvent and of the non-ionic surfactant is critical in the process according to the present invention. In fact, when the process is carried out in the absence of these solvents or of the surfactant, or is carried out with different solvents, useful results are not obtained. In particular, when the process is carried out in an aqueous medium containing the surfactant and the metal carboxylates, but not containing the nitrile or alcohol solvent, no spherical particles—and not even of submicronic size—of the mixed oxides of zirconium and yttrium are obtained.

Preferably, either the single-phase or double-phase mixture will contain from 63 to 81% by weight of organic solvent, from 6 to 20% by weight of water and from 10 to 13% by weight of non-ionic surfactant. Furthermore, the aqueous phase will preferably contain from 5 to 10% by weight of yttrium and zirconium carboxylates, with a mutual molar ratio comprised within the range of from 0.6:1 to 2:1, and preferably of from 0.8:1 to 1.3:1.

The precipitation is carried out by stirring the mixture and operating within a range of pH values of from 5 to 7. If necessary, the pH of the aqueous solution of the carboxylates of zirconium and yttrium may be adjusted by the addition of small amounts of either an organic or inorganic base. Suitable bases are alkali metal hydroxides, such as sodium hydroxide, and aliphatic amines such as butylamine. The amount of base added will suitably be comprised within the range of from 0 to $6 \times 10^{-3}$ mole per each 1,000 g of mixture in the case of alkali metal hydroxides, and of from 0 to 0.4 mol per each 1,000 g of mixture in the case of aliphatic amines.

In practicing of the process of the present invention, one of the following modalities can be selected;

when the process is carried out in the absence of added bases, the process is advantageously performed by preparing an aqueous solution of yttrium and zirconium carboxylates and a solution of the surfactant in the selected organic solvent; both solutions are then brought into contact with each other with stirring, to form the mixture;

when the process is carried to with an added organic base, the process is advantageously carried out by preparing a first mixture consisting of the organic solvent, the surfactant and the aqueous solution of zirconium and yttrium carboxylates and a second aqueous mixture consisting of the organic solvent, the surfactant and the aqueous solution of the inorganic base; the mixtures are then mixed with each other;

when the process is carried out with the addition of an organic base, the process is advantageously carried out by preparing a mixture consisting of the organic solvent, the surfactant and the aqueous solution of zirconium and yttrium carboxylates and adding a solution of the organic base in the organic solvent.

In any case, by operating under the above reported conditions, with stirring and at a temperature comprised within the range of from about 18° C. to about 25° C., a precipitate of the precursors of the mixed oxides is formed within a short time period, usually of the order of from 1 to 60 minutes. This precipitate is homogenous, amorphous and is in the form of a powder consisting of spherical particles.

According to a form of practical embodiment of the present invention, the mixture from which the precipitate is being formed is submitted to ultrasounds (sonication). In this case, a precipitate with still more reduced particle size is obtained.

When the precipitation is complete, the powder is separated from the mixture by such normal separation means as filtration and centrifugation. The powder is subsequently washed with an alcohol, e.g., with ethanol at 95% and then bidistilled water, and is eventually dried. The dried powder is then calcined at high temperatures, typically of from about 900° C. to about 1,400° C., for a time of from 1 to 10 hours. Under these conditions, the direct transformation of the cubic crystal form of zirconium stabilized with yttrium oxide is directly achieved, with the morphological characteristics of the precipitated powder being retained.

In particular, the amount of yttrium (evaluated as metal) in the calcined product may reach values as high as 21% by weight, and typically is comprised within the range of from about 10 to about 21% by weight. The particles of the calcined powder are of spherical shape, with size comprised within the range of from 0.1 to 2 $\mu$m, and with an average size smaller than 1 $\mu$m.

Therefore, the process according to the present invention enables powders to be produced with constant morphology, of mixed zirconium and yttrium oxides, or—said in an equivalent way—of zirconium oxide doped with yttrium, by a simple and economically favorable reaction. This process makes it possible to obtain the oxides in the form of particles of spherical shape, which retain their morphological features even after calcination.

The reactants used, and, in particular, zirconium and yttrium acetates, are inexpensive. The yields of precursor, i.e., of product obtained from the precipitation, are high, and in particular of from 90 to 100%, as computed relatively to zirconium.

Advantageously, the precipitation takes place at room temperature. It requires very short reaction times, and makes it possible for very large amounts of yttrium to be homogeneously incorporated in the precipitate, as set forth above.

This precipitate is directly transformed by calcination into the cubic crystal form of stabilized zirconium dioxide, which cubic crystal form is particularly useful in electrodes for fuel-flow cells.

The following experimental examples are reported to better illustrate the present invention.

EXAMPLE 1

An amount of 21 g is prepared of a first mixture containing 15 g of acetonitrile, 3 g of the commercially available surfactant from the market Brij 30 (adduct of dodecanol with an average of 4 mol of ethylene oxide added) and 3 g of aqueous, 0.2M sodium hydroxide.

This mixture is added, with stirring, to a cylindrical vessel containing 24 g of a second mixture consisting of 15 g of acetonitrile, 3 g of Brij 30 and 6 g of an aqueous solution at 2.5% by weight of zirconium acetate and 2.5% by weight of yttrium acetate. The molar ratio of yttrium to zirconium is therefore 1.23:1. By operating at room temperature (20°-25° C.), within a time of 5 minutes of the mixing, a white precipitate is formed, which is a powder constituted by particles with spherical shape. The reaction mass is kept stirred for 1 hour. The precipitate obtained is separated, is washed firstly with ethanol at 95%, and then with bidistilled water. The washed precipitate is dried at 60° C. for 12 hours in air, and 0.116 g of dried solid product is obtained.

The analysis carried out by electron microscopy indicates that the product is a powder with spherical morphology. The weight loss on calcination at 1,200° C. for 5 hours is of 33.5%. The analyses carried out by atomic absorption on the calcined product show the presence of 20.8% by weight of yttrium, and 52.3% by weight of zirconium. The yield, computed on the zirconium contained in the starting material, is 93%. The calcined powder consists of particles with size comprised within the range of from 0.2 to 2 $\mu$m, and with an average size of less than 1 $\mu$m.

EXAMPLE 2

The process is carried out as in Example 1, with a first mixture consisting of 27.7 of acetonitrile, 5.54 g of Brij 30 and 2.77 of aqueous, 0.2M sodium hydroxide being mixed with a second mixture consisting of 30 g of acetonitrile, 6 g of Brij 30 and 12 g of an aqueous solution having 2.5% by weight of yttrium acetate and 2.5% by weight of zirconium acetate. Also in this case, the molar ratio of yttrium to zirconium is 1.23:1.

Operating as in Example 1, after drying 0.503 g is collected of a solid product which is calcined for 5 hours at 1,200° C., during which time it undergoes a weight loss of 35%.

The elemental analysis shows that the mixed oxide obtained as the end product contains 15 mol % of $Y_2O_3$ and 85 mol % of $ZrO_2$. This composition is confirmed by the analysis of the cell parameters, obtained by X-ray diffraction, which shows that the product is composed by 13.5 mol % of $Y_2O_3$ and 86.5 mol % of $ZrO_2$, securing a cubic crystal form of the calcined material.

EXAMPLE 3

By operating as in Example 1, two mixtures are blended. The first mixture is composed by 2 g of aqueous, 0.2M NaOH, 5 g of Brij 30 and 25 g of n-octanol, and the second mixture consists of 0.5 g of yttrium acetate at 5% by weight in water and 0.5 g of zirconium acetate at 5% by weight in water, 1 g of Brij 30 and 5 g of n-octanol.

A white-colored, milky emulsion is obtained which, within 5 minutes, produces a colloidal, white-colored precipitate consisting of particles of from 0.1 to 2 μm in size. The reaction mixture is kept stirred for about 10 minutes, then the precipitate is separated, is washed with ethanol at 95% and then with bidistilled water, and is finally dried at 60° C. for 12 hours.

EXAMPLE 4

A single-phase mixture is prepared, which contains:
(1) freshly-distillled acetronile: 689.9 g;
(2) surfactant available from market Brij 30: 137.3 g;
(3) aqueous, 0.2M sodium hydroxide: 33.3 g;
(4) zirconium acetate at 5% by weight in water, filtered through an 0.2-μm membrane: 71.4 g;
(5) yttrium acetate at 5% by weight in water, filtered through an 0.2-μm membrane: 71.4 g.

The reactants (1), (2) and (3) are charged to a cylindrical reactor in the order shown, with stirring. A solution is obtained, to which the reactants (4) and (5) are added from a charging funnel, with a milky mixture being produced. The reaction is allowed to proceed for a 33 minutes at 20° C., with stirring, and a white-colored precipitate is formed, which is washed twice with ethanol at 95% and then with bidistilled water. The washed precipitate is dried at 60° C. for 5 hours under vacuum and 3.11 g is obtained of a solid product.

The analysis by electron microscopy shows that the product powder is constituted by particles with spherical shape. The weight loss on calcination at 1,200° C. for 5 hours is 34.4%. The analyses carried out by atomic absorption on the calcined product show that the product is constituted by 12.9% by weight of yttrium and 36.1% by weight of zirconium. The yield, computed relative to the zirconium contained in the starting reactants, is approximately 100%. The X-ray diffraction analysis confirms a cubic crystal form after calcination. The calcined powder consists of particles of from 0.2 to 2 μm of size, with an average size smaller than 1 μm.

EXAMPLE 5

A mixture is prepared, which contains:
(1) 1-octanol (a Merck product): 655.0 g;
(2) surfactant available from market Brij 30: 131.0 g;
(3) aqueous, 0.2M sodium hydroxide: 43.0 g;
(4) zirconium acetate at 5% by weight in water, filtered through an 0.2-μm membrane: 10.9 g;
(5) yttrium acetate at 5% by weight in water, filtered through an 0.2-μn membrane: 10.9 g.

The reactants (1), (2) and (3) are charged to a reactor of cylindrical shape, in the order shown, with stirring. A cloudy, emulsified mixture is obtained, to which (4) and (5) are added, as one single combined solution, from a charging funnel, with as strongly milky emulsion. The reaction is allowed to proceed for a 33 minutes time at 20° C., with stirring, and a white-colored precipitate is formed, which is washed twice with ethanol at 95%. The washed precipitate is dried at 60° C. for 6 hours under vacuum and 0.71 g of solid product is obtained.

The analysis by electron microscopy shows that the powder is constituted by particles with spherical shape. The weight loss on calcination at 900° C. for 5 hours 35%. The analyses carried out by atomic absorption on the calcined product show that the product is constituted by 19.2% by weight of yttrium and 27.2% by weight of zirconium. The yield, computed relative to zirconium contained in the starting reactants, is approximately 100%. The X-ray diffraction analysis confirms that the obtained product has a cubic crystal structure after calcination. The calcined powder consists of particles of from 0.2 to 2 μm of size, with an average size smaller than 0.5 μm.

We claim:

1. A process for preparing mixed oxides of zirconium and yttrium, $ZrO_2(Y_2O_3)$, having from about 15 to about 21 percent by weight yttrium, computed as elemental metal, wherein said oxides are spherical particles ranging from 0.1 to 2 μm in size, with an average size of the particles being less than 1 μm, in cubic crystal form, said process comprising;
   (a) preparing a mixture comprising:
      (i) an aqueous solution of zirconium and yttrium carboxylates;
      (ii) an organic solvent selected from the group consisting of aliphatic nitriles containing from 1 to 3 carbon atoms, and aliphatic alcohols containing from 8 to 11 carbon atoms; and
      (iii) a non-ionic surfactant;
   (b) adjusting the pH of said mixture to from 5 to 7 at room or close to room temperature to precipitate out of said mixture solid colloidal particles which are precursors of said mixed zirconium/yttrium oxides; and
   (c) calcining the precipitated solid particles at a temperature ranging from about 900° C. to about 1400° C. to directly convert the particles from an amorphous state into a cubic crystal form.

2. A process as defined in claim 1, wherein said yttrium and zirconium carboxylates (a)(i) comprise salts of lower aliphatic carboxy acids of yttrium and zirconium.

3. A process as defined in claim 2, wherein said yttrium and zirconium carboxylates comprise zirconium and yttrium acetates.

4. A process as defined in claim 1, wherein said organic solvent (a)(ii) is selected from acetonitrile and n-octanol.

5. A process as defined in claim 1, wherein said non-ionic surfactant (a)(iii) is selected from ethoxylated aliphatic alcohols containing from 8 to 10 carbon atoms in the alkyl portion and from 4 to 8 condensed units of ethylene oxide in the ethoxy portion.

6. A process as defined in claim 1, wherein said mixture (a) comprises from 63 to 81% by weight of organic solvent, from 6 to 20% by weight of water and from 10 to 13% by weight of non-ionic surfactant, and having an aqueous phase containing from 5 to 10% by weight of yttrium and zirconium carboxylates with a mutual molar ratio of from 0.6:1 to 2:1, and wherein the pH adjustment is carried out at a temperature of from about 18° C. to about 25° C.

7. A process as defined in claim 6, wherein said process further comprises stirring the mixture (a) for a time of from 1 to 60 minutes.

8. A process as defined in claim 6, wherein said mutual molar ratio is from 0.8:1 to 1.3:1.

9. A process as defined in claim 1, wherein the pH is adjusted by the addition of an alkali metal hydroxide in an amount of from 0 to $6 \times 10^{-3}$ mol per each 1000 g of the mixture (a).

10. A process as defined in claim 9, wherein said alkali metal hydroxide comprises sodium hydroxide.

11. A process as defined in claim 1, wherein the pH is adjusted by the addition of an aliphatic amine in an amount of from 0 to 0.4 per each 1000 g of the mixture (a).

12. A process as defined in claim 11, wherein said aliphatic amine comprises butylamine.

13. A process as defined in claim 1, further comprising subjecting the mixture in step (b) to ultrasound.

14. A process as defined in claim 1, wherein said calcining step (c) is carried out for from 1 to 10 hours.

* * * * *